(No Model.) 5 Sheets—Sheet 1.
H. M. SMITH.
PLANTER AND FERTILIZER DISTRIBUTER.
No. 551,454. Patented Dec. 17, 1895.
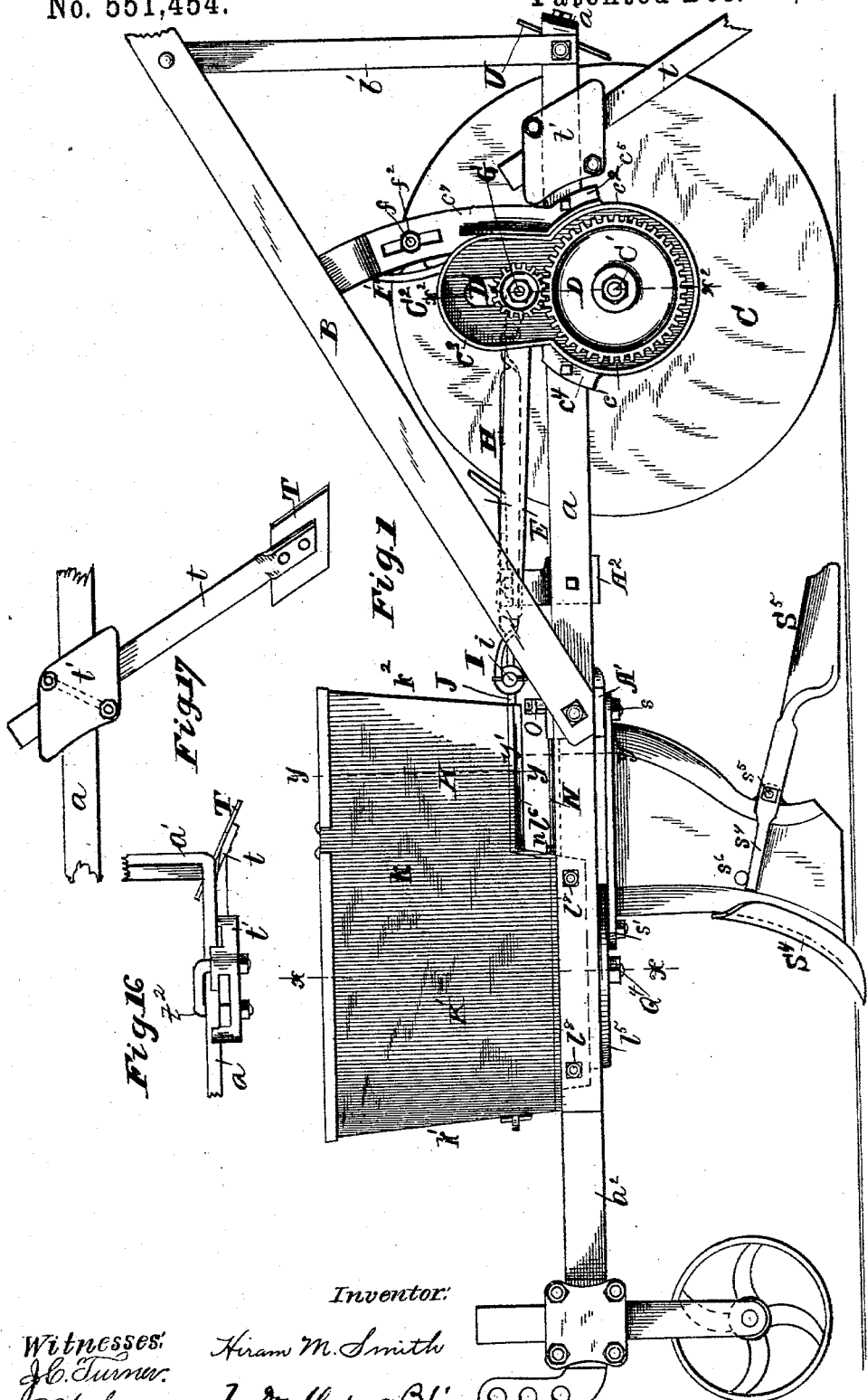
Witnesses:
J. C. Turner.
R. H. Sommers.
Inventor:
Hiram M. Smith
By Doubleday & Bliss
attys

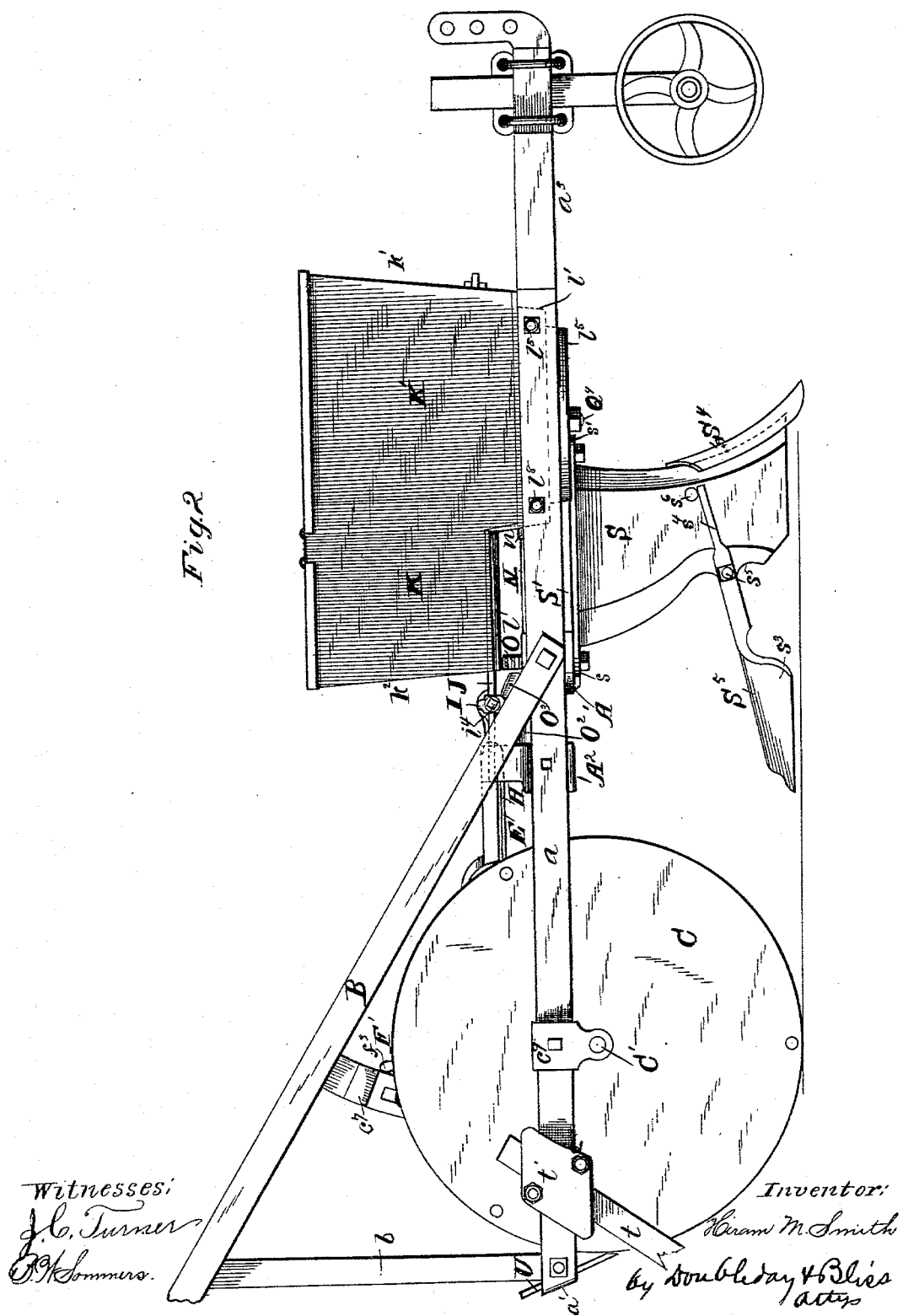

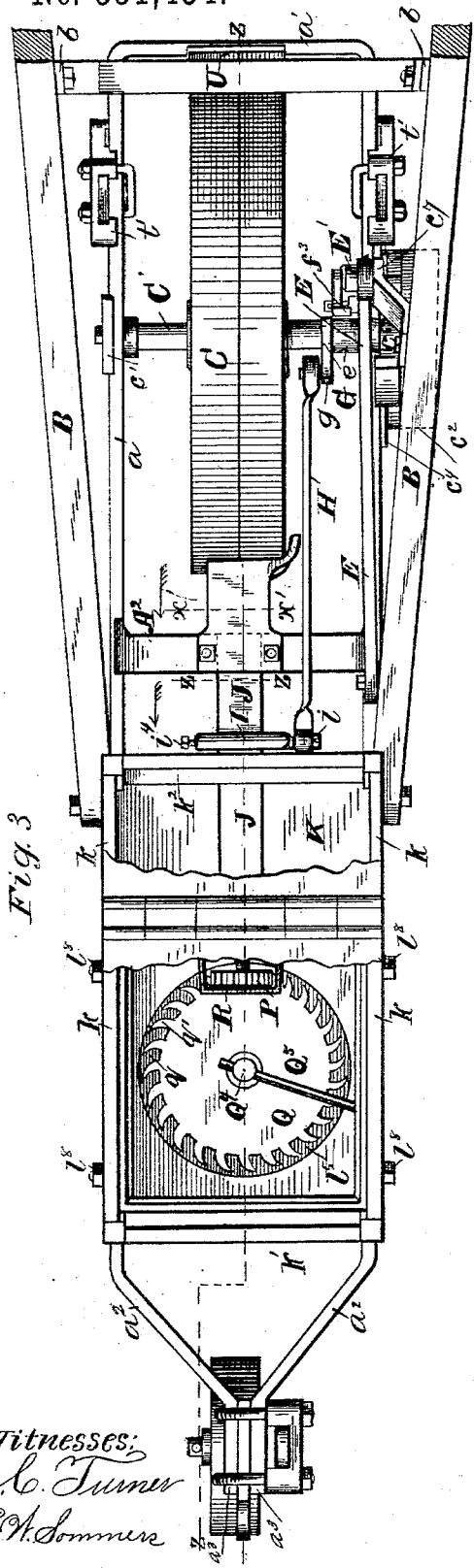
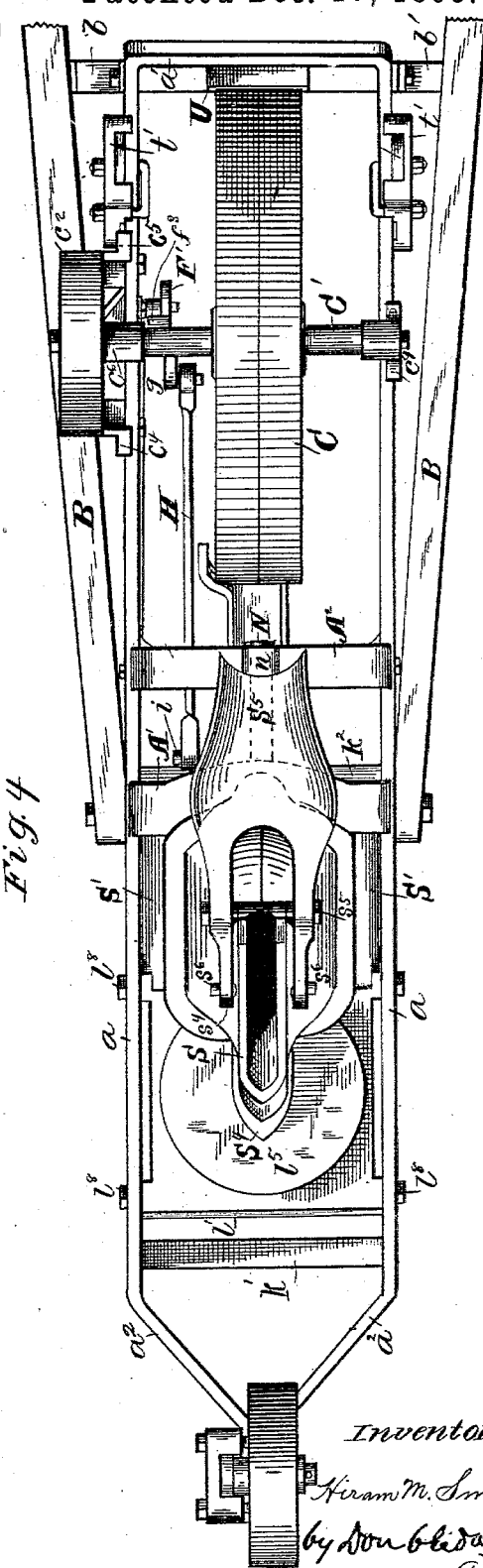

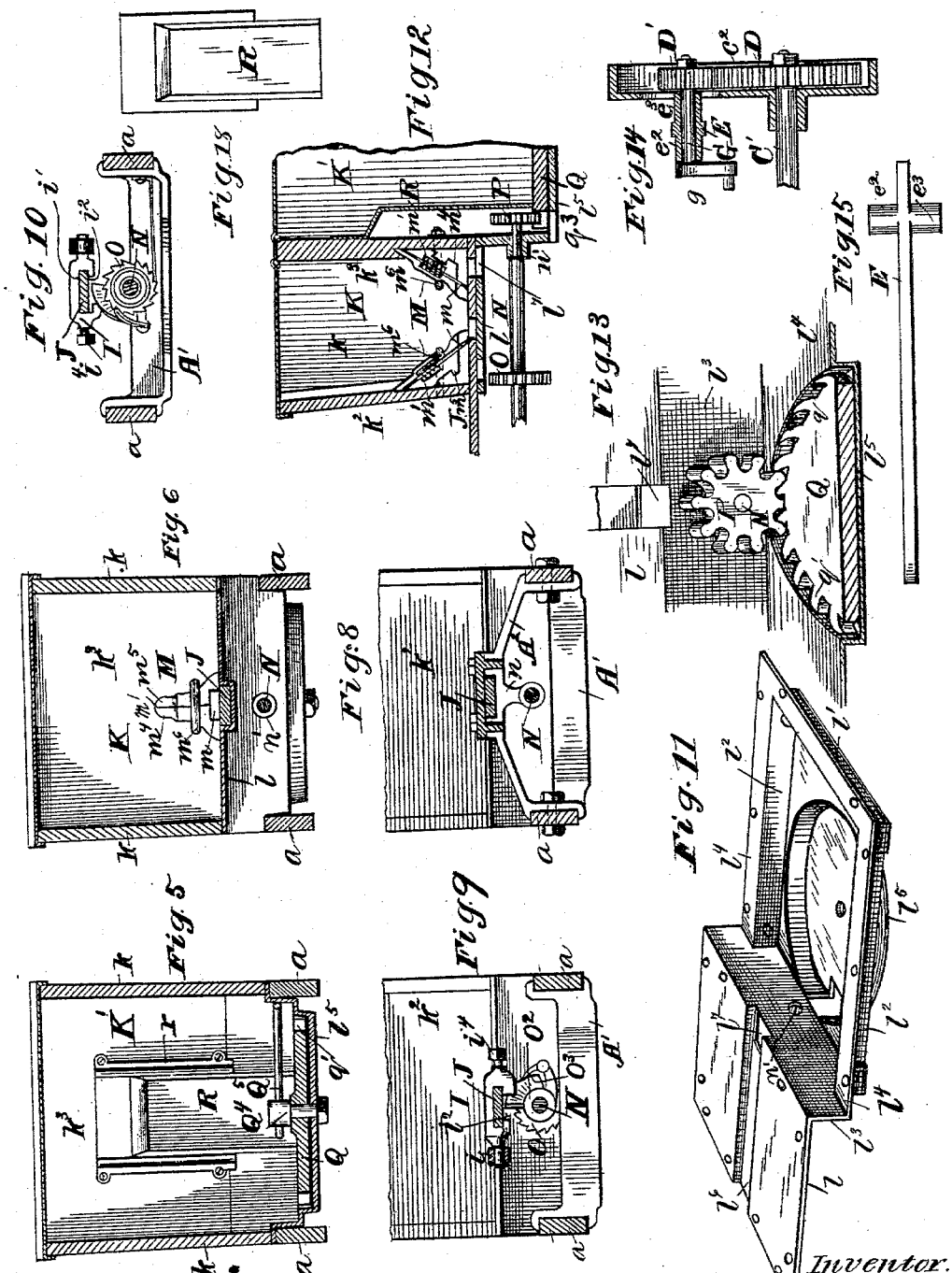

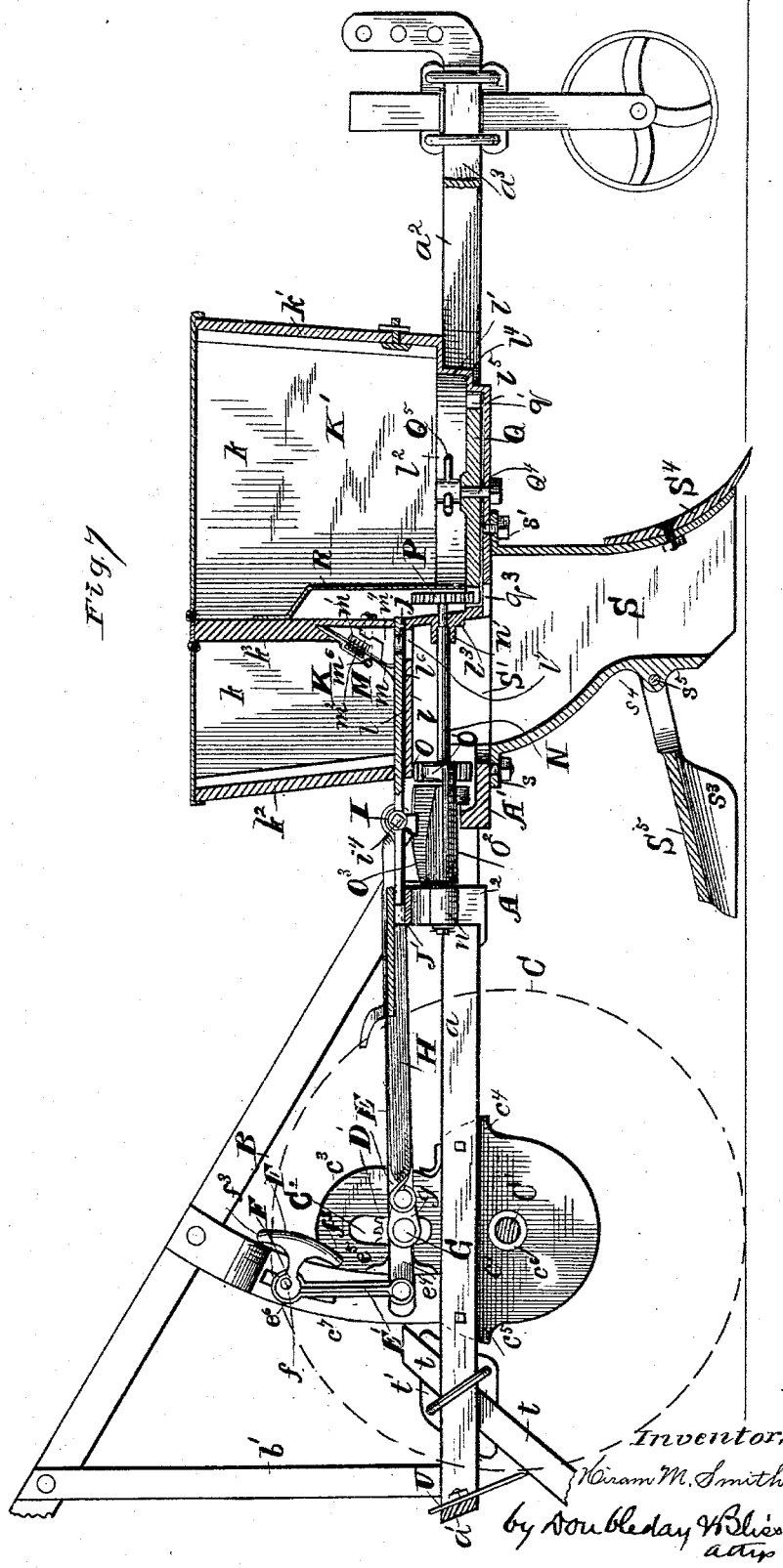

UNITED STATES PATENT OFFICE.

HIRAM M. SMITH, OF RICHMOND, VIRGINIA.

PLANTER AND FERTILIZER-DISTRIBUTER.

SPECIFICATION forming part of Letters Patent No. 551,454, dated December 17, 1895.

Application filed February 21, 1898. Serial No. 264,738. (No model.)

*To all whom it may concern:*

Be it known that I, HIRAM M. SMITH, a citizen of the United States, residing at Richmond, in the county of Henrico and State of Virginia, have invented certain new and useful Improvements in Planters and Fertilizer-Distributers, of which the following is a specification, reference being had therein to the accompanying drawings.

Figure 1 is a side elevation of a planter embodying my improvements. Fig. 2 is a side elevation from the opposite side. Fig. 3 is a top plan view. Fig. 4 is a bottom plan view. Fig. 5 is a cross-section on line $x\ x$, Fig. 1. Fig. 6 is a section the line $y\ y$, Fig. 1. Fig. 7 is a longitudinal section on the line $z\ z$, Fig. 3. Fig. 8 is a partial section on the line $x'\ x'$, Fig. 3. Fig. 9 is a partial section on the line $y'\ y'$, Fig. 1. Fig. 10 is an end view of the ratchet-wheel and its actuating-pawl and sleeve, some of the parts being shown in section. Fig. 11 is a perspective of the metallic bottom portion of the hoppers detached. Fig. 12 is a longitudinal section showing a modified form of corn-dropping devices. Fig. 13 is a partial perspective of the fertilizer devices. Fig. 14 is a vertical section on the line $x^2\ x^2$, Fig. 1. Fig. 15 is a plan view of the bar which supports the vibrating gear-wheel. Fig. 16 is a plan view of one of the covering-shovels and the parts immediately adjacent. Fig. 17 is a side view of the same. Fig. 18 shows the fertilizer cut-off detached.

The main frame A of the machine consists preferably of a single steel bar, bent to have the side portions $a$, the cross connecting part $a'$, the inwardly-turned parts $a^2$, and the parts $a^3$ for uniting the frame to the front supporting-wheel. This steel frame is provided with cross-pieces A' A² at points intermediate of the ends, these being secured to the side parts $a$ by bolts.

The handles B are bolted at their front ends to the side pieces $a$ and the rear parts thereof are supported by braces $b\ b'$.

The wheel C, depended on for packing the earth upon the seed and rolling the ground, is supported on a shaft C'. This at one end is mounted in a bearing-block $c^9$ depending from one of the side parts $a$ of the main frame. The other end of this shaft is mounted in a casting which has the back plate $c'$ with a bearing at $c^6$ for the shaft C', and it has also outwardly-extending flanges $c^2\ c^3$, a slot $C^2$, a clamping-flange at $c^4$ for uniting it to the main frame and another at $c^5$, the latter being formed on the plate or arm $c^7$ cast with the last aforesaid parts and extending some distance upward. Upon the outer end of shaft C' is mounted the gear-wheel D within the chamber formed by the flange $c^2$. This is adapted to engage with and drive a pinion D' of one size or another situated in the chamber formed by the flange $c^3$. Pinion D' is mounted on the shaft G, which is adapted to rise and fall to permit the seeding mechanism to be thrown in and out of gear. This shaft G is mounted in an arm E which at the front end is pivoted to one of the stationary parts— as, for instance, to one of the handles B— carrying the sleeve-bearing $e^2\ e^3$ for the shaft, as shown clearly in Figs. 14 and 15. Arm E projects beyond the shaft as at $e^4$ and is cast with a flange at $e^5$ adapted to engage with the edge of the aforesaid plate $c^7$, which edge is curvilinear and acts to properly guide the arm E and hold it in place. The projecting end $e^4$ of arm E has pivoted to it a link E', which at the upper end is formed with an eye $e^6$. This eye engages with an eccentric F which is mounted on a stud shaft or pin $f$, the latter being shown as secured by nut $f^2$ to the upwardly-projecting plate $c^7$. The eccentric F is cast with a double handle F' having reduced ends $f^3$, whereby it can be grasped. When this part F' and the eccentric F are turned into one position, the arm E is lowered and with it the pinion D', and when they are turned into the opposite position the arm and pinion are lifted up to throw the latter out of engagement with wheel D.

The inner end of shaft G has a crank $g$ connected to a pitman H. The forward end of this pitman is pivoted at $i$ to a cross-head I. The latter is cast with an aperture at $i'$ and (as shown in Fig. 9) is formed with a spiral slot $i^2$ in its lower edge, and has a set-screw $i^4$ mounted in the end.

J represents the seed-dropping plate or bar, it being arranged to slide rectilineally, having one end mounted in a guide J', secured to the above-mentioned cross-bar A², joined to the main frame. The seed-feeding bar passes through the cross-head I and is clamped therein by the set-screw $i^4$, and carries the latter to and fro as it (the seed-bar) reciprocates. This bar passes through the front wall of the seed-receptacle, the latter, in conjunction with the fertilizer-carrier, being constructed as follows:

The chambers for the seed and the fertilizer are respectively indicated by K K'. The side walls $k$, the front wall $k'$, the rear wall $k^2$ and the partition $k^3$ for the chambers are formed of wood, and they are, at the bottom, secured to a casting having the following parts, to wit: a bottom plate $l$ for the seed-receptacle, a vertical plate $l'$ at the front of the fertilizer-receptacle, side plates $l^2$ and rear plate $l^3$ for the latter, flanges at $l^4$, and a depressed bottom $l^5$. The bottom plate $l$ of the seed-hopper is elevated considerably above the bottom parts of the fertilizer-receptacle, and all of the parts of the device as a whole are so arranged, as will be seen, that the fertilizer and the corn can be both delivered to the same boot.

The bottom $l$ of the seed-receptacle is provided with a depressed guideway $l^6$ of such depth that the upper surface of the seed-dropping bar J shall be flush with the upper surface of the bottom plate $l$.

$l^7$ indicates the escape-passage for the seed from the seed-receptacle. This lies below the cut-off, which is generally indicated by M. It comprises a sliding cut-off plate $m$, which in the form shown in Fig. 12 is mounted at an angle to the bar J and is adapted to slip along its upper surface and, at the same time, can yield upwardly. It is mounted in a guide having a chamber at $m'$ for a coiled spring $m^{10}$. The shank $m^2$ of the cut-off plate passes through the coiled spring, the latter bearing against the shoulder $m^3$ on the guide and acting to hold the cut-off down upon the bar J. Preferably, as shown in Fig. 6, the guide $m'$ is made in two substantially similar halves $m^4 m^5$. This cut-off M (including the plate $m$ and the guide $m'$) is secured to the partition $k^3$ by staple-bolt $m^6$.

The dropping-bar J is provided with one or more apertures $j$ of suitable size and the moving parts are so related that the bar shall in its forward movement bring these apertures under the mass of seed in the hopper, and then in its opposite movements shall carry the seed which enter the aperture under the cut-off $m$ and drop them through the exit at $l^7$. The intervals between the successive dropping actions can be varied by means of the different sizes of pinions D'. These pinions are readily removed and the one of the desired diameter can be easily applied. The parts which move the bar J are also utilized to effect an intermitting delivery of fertilizer from the hopper K' as follows:

N represents a shaft having its rear end mounted in a bearing at $n$, cast with or secured to the aforesaid cross-bar $A^2$ of the main frame, and at the front end it is mounted in a bearing at $n'$ cast with the wall $l$ of the hopper-beam. This shaft receives an intermittent or step-by-step movement by means of a ratchet-wheel O (shown in Figs. 7 and 10) which is keyed to it and a pawl O'. The latter is secured to a sleeve $O^2$ mounted loosely on the shaft N and having a spiral feather $O^3$ cast with or secured to it. This feather is fitted to the above-described spiral slot $i^2$ in the cross-head I. The feather is of such pitch as to give to shaft N a part of the revolution somewhat greater than the distance between the teeth of the ratchet-wheel O. The pawl has a spring $o$ which holds it in engagement with the teeth. It will be seen that as the bar J and cross-head I advance, the feather $O^3$, sleeve $O^2$, and pawl O' push the ratchet-wheel, and as the parts J and I recede the pawl slips over the next tooth on the wheel.

Shaft N has at its front end a toothed or fingered wheel P situated within a casing or cover immediately inside of the fertilizer-hopper. The fertilizer-distributer proper consists of a horizontal wheel Q, which is formed with a series of chambers $q$, these being preferably at the periphery, the partitions $q'$ thus virtually constituting teeth. These teeth are at such a distance apart that they can be successively engaged by the teeth of wheel P. The distributing-wheel Q is of such thickness that the upper surface thereof is flush with the true bottom at $l^4$ of the hopper. The chambers $q$ are filled with the fertilizing material and are successively brought to the escape-exit at $q^3$, at which point they drop their contents, or is forced from them by means of the teeth of the wheel P.

The amount of material delivered at each step can be varied by varying the size of the chambers $q$, by using disks with different-spaced teeth. Ordinarily the parts of the machine are so adjusted that the dropping of the fertilizer will occur at the moment of the dropping of the seed from passage $l^7$. If it is desired to have the seed drop sooner or later, it can be accomplished by varying the position of the exit at $l^7$ of the seed-hopper.

R represents a cut-off plate or shield which is mounted vertically in guides at $r$. (Shown in Fig. 5.) It extends across the face of wheel P and its lower edge rests upon the upper surface of distributing-wheel Q and scrapes off the fertilizer, so that only the desired amount shall be carried to the exit. It is loose in its guides and being made of cast-iron, possesses such weight that it will be normally held down in place, and at the same time can yield to permit the passage of hard substances or lumps, if they should be present.

The distributing-wheel Q is mounted on the vertical shaft $Q^4$ secured to the bottom plate $l^5$.

$Q^5$ is a stirring-arm which acts to loosen up, more or less, the fertilizer adjacent to the place where the chambers $q$ begin to pass under the cut-off, and it operates to break up any lumps or cakes that might tend to form and insures that there shall be sufficient of the material moving downward to fill the chambers successively.

The materials which are delivered from the hoppers are received by the boot S. This, so far as the body of it is concerned, may be of any preferred form, though I have shown one having certain features of improvement which I employ. At the upper end it is provided with ears $s\ s'$, the former for bolting it to the bottom wall $l^5$ of the fertilizer-hopper, and the latter for bolting it to the aforesaid cross-bar A' of the main frame. At the sides of the boot there are wooden extensions S' which are fitted inside of the bars A of the main frame. At the lower end the boot carries a covering device $S^5$, which consists of a concavo-convex plate $s^3$ and forwardly-projecting arms $s^4$. It is pivoted at $s^5$ and at $s^6$. There are stops in the form of lugs, against which the arms $s^4$ can strike when they reach the desired limit of the downward movement. This cover I have found to be very advantageous. It not only acts to draw in the soil which has been displaced by the opening-shovel at $S^4$, but smooths and more or less packs the same preparatory to the action of the wheel C. It undulates freely on the pivot, and at the same time is prevented by the lugs $s^6$ from dropping below the point of the boot. If it should so drop, it would interfere with the proper guiding of the machine, especially when it was being turned round.

On examining Figs. 6, 7, 11, and 13 it will be seen that by shaping the metallic bottom portions of the hopper in the way shown and described I am enabled to drop them much lower than is possible when these parts are constructed in the ordinary way. The bottom $l^5$ and the distributing-wheel Q can be lowered three or four inches in a full-sized machine, and, as a result of this, the center of gravity of the whole device can be brought down, so that the tendency of the machine to be top-heavy is overcome and it can be much more readily managed than is the case where these heavy metallic parts are elevated, relatively. The bottom metallic parts of the hopper are fitted between the steel bars $a\ a$ of the main frame and can be secured directly thereto by bolts, as at $l^8$.

T T represent scrapers which are situated behind the packing-wheel. They are held by inclined arms $t\ t$ which are adjustably secured to the main frame-bars $a$ by the clamping-blocks $t'$. These clamping-blocks have, as shown in the drawings, a groove or guiding passage-way to receive the frame-bar A, and another to receive the shovel-arm, and with each there is a stirrup-bolt $t^2$. These scrapers act to again loosen up the earth somewhat in rear of the wheel C and prevent the forming of a cake or crust at the surface, such as is apt to form in many soils after they have been pressed or packed.

When planting some seeds, I prefer to have at least two apertures $j$ in the sliding bar J, both of which act at each movement of the bar, and in such case, as shown in Fig. 12, I prefer to employ another cut-off more or less similar to that at M, the second one being placed at the other end of the hopper. When the second seed-feeding device is employed, it will be seen that there are two seed-dropping actions at each reciprocation of the feeding-bar, and with these devices the dropping of the seed will be frequent, as is desired in planting corn and other seeds for some purposes.

In Fig. 12 is illustrated such an arrangement of the seed-planting device as is last above referred to.

Behind the ground-wheel C there is placed a scraper U secured to the cross connecting part of the main frame, it being adjustable toward and from the wheel to regulate the position of its edge relatively thereto for the purpose of keeping the periphery clean.

Although I have above described in detail the parts of the machine herein shown, it will be understood that in many respects there can be modifications without departing from the spirit of the invention. Thus the ground-wheel C may be in front instead of in rear of the distributing mechanism. The hopper shown can be used with seed-dropping and fertilizer-distributing devices of other sorts; and so far as some of the features of the invention are concerned, the seed-dropping parts and the fertilizer-distributer may be operated otherwise than by means of the devices herein which directly connect them together.

What I claim is—

1. The combination with the steel bar main frame, of the distributing hopper having a metallic bottom portion formed with vertical walls at the bottom fitted between the side bars and the frame, and horizontal flanges which lie above the said side bars, substantially as described.

2. The combination of the steel bar main frame with the distributer hopper having an upper wider portion, the narrower bottom portion to receive the distributing wheel, and the intermediate part of a width intermediate between the aforesaid upper and lower parts, the said lower and intermediate parts being arranged below the top of the main frame, substantially as set forth.

3. In a seed planter and fertilizer distributer, the herein described hopper bottom having the upper bottom plate $l$ for the seed receptacle, the lower bottom plate $l^5$ for the fertilizer receptacle, and the vertical walls connecting the said bottom plates and formed integrally therewith, substantially as set forth.

4. In a seed planter and fertilizer distributer, the herein described hopper bottom having the upper bottom plate $l$ for the seed receptacle, the vertical plate $l'$, side plates $l^2$, flanges $l^4$, and a depressed bottom plate $l^5$ for the fertilizer receptacle, said parts being cast integral and arranged substantially as set forth whereby the fertilizer receptacle can be lowered below the top of the supporting frame of the machine, substantially as set forth.

5. In a seed planter and fertilizer distributer the combination with the single hopper having two compartments, the rectilineally reciprocating actuating device for one compartment, and the intermittingly rotating distributing device for the other compartment actuated by the said reciprocating actuating device, substantially as set forth.

6. The combination with the box having the seed compartment and the fertilizer compartment, and having the metallic bottom plate formed with the vertical wall $l^3$ between the said compartments, of the feeder inside of said box, the feeder-operating shaft passing through said wall $l^3$, and carrying the feeder actuating wheel P, or equivalent, on the inside of said box, substantially as set forth.

7. The combination with the box or receptacle, of the horizontally revolving feeder wheel Q in the bottom thereof, the wheel P inside the said box and engaging with said wheel Q, the shaft projecting through the wall of said receptacle and carrying said wheel P, and the sliding cover R, to inclose said wheel P, substantially as set forth.

8. The herein described hopper or receptacle for a planter having two compartments with the cast metal bottom, with the depressed plate $l^5$, and the upper plate $l$ integral therewith, and having the flat continuous side pieces $k\ k$, and the flat end walls $k'$, $k^2$, and the partition $k^3$, all fitted and secured to the said bottom plate, substantially as set forth.

9. In a planter and fertilizer distributer, the combination with the two simultaneously acting feeder mechanisms, one having the slide J, of the rotating shaft N which actuates one of said feeders, the ratchet wheel O, pawl O', rocking feather $O^3$, connected to wheel O, and the cross head I clamped to said slide J, and having the slot $i^2$, whereby it is connected with said feather, substantially as set forth.

10. In a planter the combination with a reciprocating distributer and the ground wheel, of the gear wheel D rotated by the ground wheel, the pinion D', the crank shaft connected to the distributer, the arm E pivoted to the frame, the plate having curvilinear guides for the arm E, and the eccentric moving and fastening device, substantially as set forth.

11. In a planter, the combination with the furrow forming mechanism, the seed dropper, the cover and the earth packer carried by the seed dropper, of independent scrapers or shovels behind the packer to loosen the surface of the soil, substantially as described.

12. In a planter, the combination with the distributing mechanism and the ground wheel, of the gearing D D', and the casting having a support for the wheel D, a support for the wheel D', and the plate $c^5$ all formed integrally together and adapted substantially as set forth, to connect the gearing to the main frame, substantially as described.

13. In a planter, the combination with the seed receptacle, the fertilizer receptacle and the fertilizer distributer, of the seed dropping bar J and the shaft N below the said seed dropping bar and substantially parallel therewith and connected to the fertilizer distributer substantially as described.

In testimony whereof I affix my signature in presence of two witnesses.

HIRAM M. SMITH.

Witnesses:
THOS. C. BAIN,
J. R. MARSHALL.